(No Model.) 2 Sheets—Sheet 1.

W. R. WHITE.
GATE.

No. 587,415. Patented Aug. 3, 1897.

Witnesses

Inventor
Wm R. White
by Foster Freeman
Attorneys (No Model.) 2 Sheets—Sheet 2.

W. R. WHITE.
GATE.

No. 587,415. Patented Aug. 3, 1897.

Witnesses
Inventor
Wm. R. White
by
Attorneys

UNITED STATES PATENT OFFICE.

WILLIAM RICHARD WHITE, OF BLOOMINGTON, ILLINOIS.

GATE.

SPECIFICATION forming part of Letters Patent No. 587,415, dated August 3, 1897.

Application filed March 12, 1895. Serial No. 541,489. (No model.)

*To all whom it may concern:*

Be it known that I, WILLIAM RICHARD WHITE, a citizen of the United States, residing at Bloomington, in the county of McLean and State of Illinois, have invented certain new and useful Improvements in Gates, of which the following is a specification.

My present invention relates particularly to gates of the kind illustrated in my Patents No. 493,539, dated March 14, 1893, and No. 503,887, dated August 22, 1893, although some, if not all, of the improvements hereinafter described are applicable to other styles of gates.

My invention has for its object to improve the connecting-piece between the inner ends of the operating-levers and the frame which projects laterally from the side of the gate, in order to better insure that a uniform motion or movement shall be imparted to the gate-operating levers whether the gate be open or closed.

The invention has for a further object to steady and guide the inner ends of the gate-operating levers, preventing them from having any lateral or sidewise movement and undue looseness; and the invention has for a further object to improve and strengthen the framework which supports and carries the gate-operating levers.

With these objects in view my invention consists of the improvements which will be set forth in the following specification and which are illustrated with some fullness in the accompanying drawings, wherein they are shown as combined with a swinging gate which embodies a number of my inventions.

I do not in this application claim the gate or any improvements thereon or any improvements on the parts which are carried directly thereby, the improvements herein described being based upon the gate-operating mechanism.

The drawings accompanying this specification are for the purpose of illustrating my invention and its practical application and do not pretend to show all the modifications and variations in form to which my invention is subject.

Figure 1:
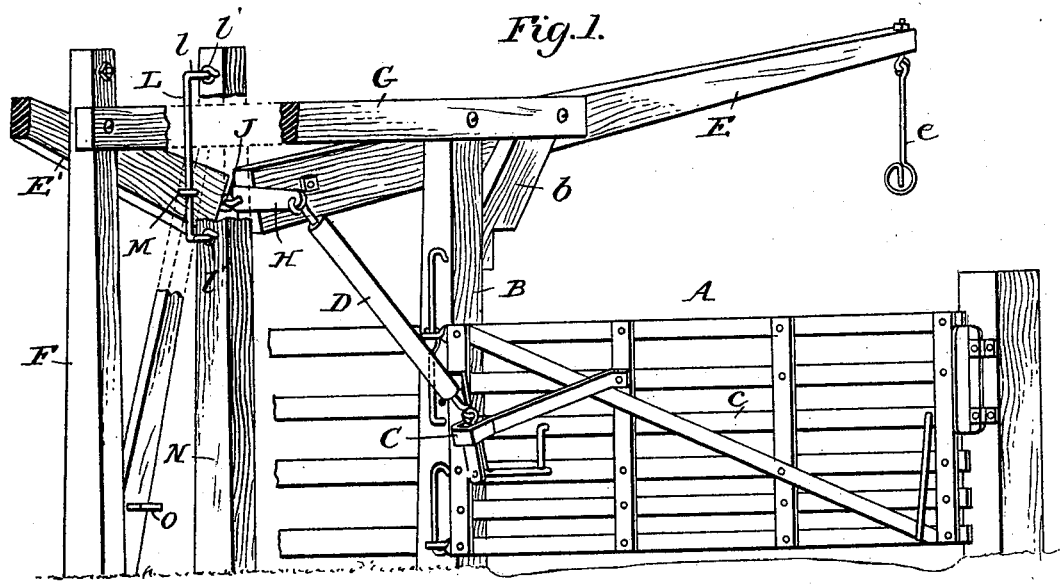
Figure 2:
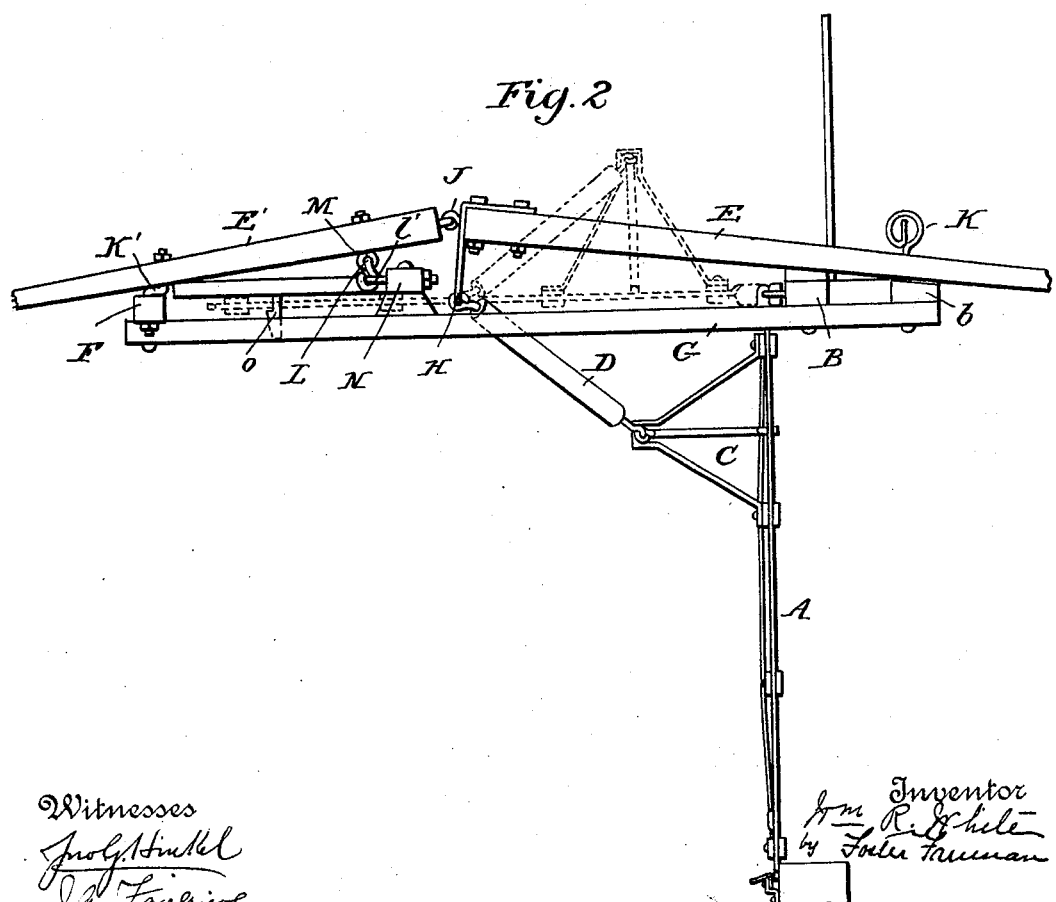
Figure 3:
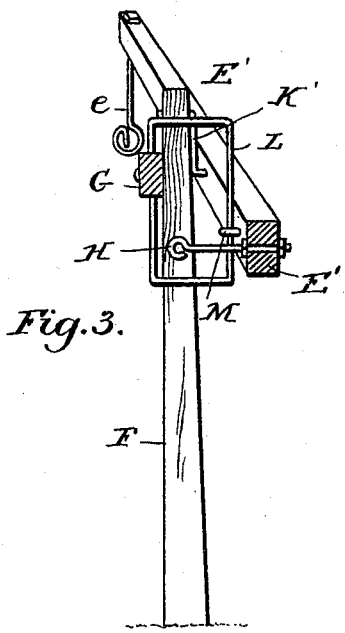
Figure 4:
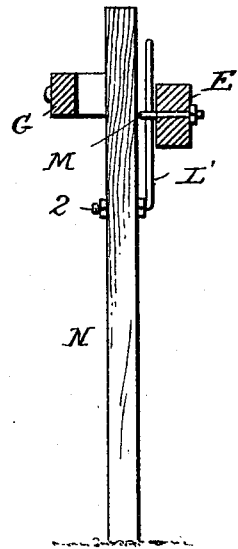
Figure 5:
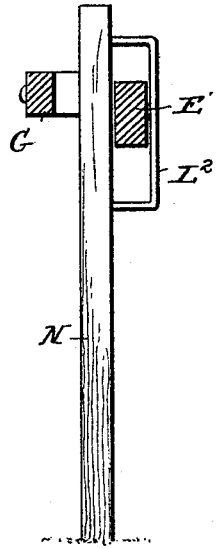
Figure 6:
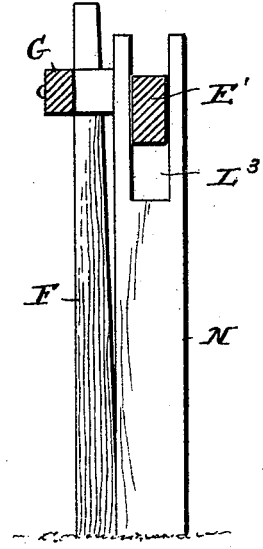

In the said drawings, Figure 1 is a perspective view of a gate and gate-operating mechanism and supporting-framework therefor embodying my improvements. Fig. 2 is a top plan view of the part shown in Fig. 1. Fig. 3 is an elevation showing a somewhat different arrangement of framework from that illustrated in Figs. 1 and 2. Figs. 4, 5, and 6 illustrate different forms of guides for the inner ends of the operating-levers.

In the said drawings, A represents a gate which is hinged to a post B. The gate is provided with a laterally-projecting frame C, which in the form of my gate as shown constitutes a support for one end of the latch-operating bar c, to which is connected the lower end of the connecting-bar D, the upper end of which has connection with the gate-operating-levers E E'. These levers are supported, respectively, upon the post B or upon an arm b, projecting therefrom, and upon a post F, situated beside the roadway and toward and from which the gate swings as it opens and closes.

G represents a connecting-piece between the upper ends of the posts B and F, serving to maintain the posts in upright position and in proper relation to each other.

In gates of the character illustrated it is preferable that the operating-levers E E' should be inclined to the roadway—that is, their outer ends, to which the handles e are attached, should extend toward the roadway, while their inner ends extend away therefrom—this being for the purpose of disposing the handles e near the roadway, so that a person in a vehicle need not drive too near the post B in order to reach the handles and operate the gate.

It is to be understood that the laterally-projecting frame C, to the outer portion of which the lower end of the connecting-bar D is connected, swings under the operating-levers, or one of them, as the gate is swung from its open to its closed position, and vice versa, so that the connecting-bar inclines to one side of the levers when the gate is closed and to the other side of the levers when the gate is opened. In order that the same amount of force shall be required and the same amount of motion given the operating-levers in order to both open and to close the gate, it is necessary that the degree of inclination of this connecting-bar D should be the same, though in opposite directions, when the gate is opened and when closed, and to insure this relation of the connecting-bar to the gate in its different positions it is necessary that the upper end of the connecting-bar should have connection with the operating-levers at a point which is opposite to the midway point in the arc described by the outer portion of the laterally-projecting frame C as it moves from one extreme or position to the other or, in other words, directly opposite to the hinge or pivotal line upon which the gate swings substantially in the same vertical plane.

It is one of the objects of my invention to arrange the upper connection of the connecting-rod at this point, so that the same force and movement is required both to open and to close the gate. Where the operating-levers are arranged to operate as described—that is, inclined to the roadway—it is necessary that the jointed connection of the upper end of the bar D with the operating-levers should be set off or to one side of the inner ends of the operating-levers. I therefore provide one of the operating-levers at or near its inner end with an arm H, which projects laterally from the lever toward the roadway and has a jointed connection with the upper end of the connecting-bar at a point opposite to the hinge upon which the gate turns. The preferred form of arm H is that shown in Figs. 1 and 2, consisting of an angular-shaped piece of flat metal secured to the end and one face of the lever E and provided with an aperture near its end, with which a hooked portion of the connecting-bar engages. This arm, however, may be in the form of a screw-rod passing through the lever near its end and provided at its outer end with an eye, with which the hook end of the connecting-bar engages. This latter construction is, however, not so desirable as the one first described, as it is more liable to become loose.

In order that the operating-levers shall work together, their inner ends are connected by the interlocking screw-eyes J or an equivalent jointed connection.

K represents a fixed fulcrum-pin upon which the lever E swings, and K' a link constituting a movable fulcrum for the lever E'. The inner ends of the operating-levers being connected in such way as not to allow them to separate, it follows that one or both of the levers must be mounted upon a fulcrum which can swing; but it is undesirable that both the fulcrums or supports for the levers should be movable, as such a construction would produce looseness of parts, and therefore I mount one of the levers upon a fixed fulcrum and the other upon a movable fulcrum, as described.

Much difficulty has been experienced by me in overcoming lost motion in the operating mechanism for the gate and in preventing the inner ends of the operating-levers from having lateral motion or swaying, more particularly when the gate to be operated is heavy or from any cause does not swing easily.

I have therefore devised a novel form of guide for the inner ends of the operating-levers which insures that they shall work upon true vertical lines. This guide is vertically disposed and has connection with one of the operating-levers, so that while it permits it to freely vibrate up and down it prevents any lateral or swaying movement thereof.

The form of the guide which I prefer is that illustrated in Figs. 1 and 2 and consists of a rod L, the ends of which are bent to form horizontal portions $l$, which are connected with their supports by hinges or jointed connections, as at $l'$, so that the guide-rod as a whole can vibrate to a limited extent upon a vertical axis. One of the gate-operating levers E' is provided with an eye M, which encircles the guide-rod L, sliding freely up and down thereon as the lever is vibrated and serving in connection with the guide-rod to hold the levers against lateral vibration. Where the operating-levers are arranged and connected as shown in the drawings and are connected with the guide-rod by an eye which encircles the rod, it is necessary in order to prevent binding of the eye upon the rod that the guide should have a limited amount of play, and for that purpose it is jointed or hinged, as shown. The guide might be supported directly by the cross or connecting piece G, which extends between the posts B and F, and such an arrangement is illustrated in Fig. 3; but unless this cross-piece be very heavy and strong or the gate to be operated be light and easily worked there is liability of a lateral or swaying motion being imparted to the connecting-piece, and thus the very purpose for which the guide is intended would be defeated. I therefore arrange a post N between the posts B and F and secure the upper end of this post to the connecting or cross piece G. This makes a strong supporting-framework for the operating mechanism of the gate, which is braced and strengthened at a point opposite to the inner ends of the operating-levers, thereby forming a rigid support or means of attachment for the guide. In the constructions shown in Figs. 1 and 2 the jointed connections $l'$ of the guide are supported by the post N. An inclined post or brace may be arranged between the posts F and N, and the catch $o$, which operates to hold the gate in its open position, may be arranged upon this brace.

In Fig. 4 there is shown a different form of guide for the inner ends of the operating-levers. It consists of a rod L', supported at one end only, its lower end being shown as bent at a substantially right angle to the main portion of the guide and constituting an arm 2, which passes through the post N, being properly held in place by nuts which engage with screw-threaded portions of this arm 2. The guide swings upon the arm 2 as a pivot, thus giving to the guide the necessary movement to prevent the eye M, which engages therewith, from binding.

In Fig. 5 is shown another form of guide. It consists of a staple $L^2$, carried by the post N, between the vertical portion of which and the post one of the operating-levers rests. The space between the post and the guide is just sufficient to allow free movement of the lever while preventing any lateral motion thereof, and the staple is sufficiently long to allow the necessary vibration of the lever in order to operate the gate.

In Fig. 6 there is shown another form of guide, it being formed by slotting the upper end of the post N, as represented at $L^3$. The parts of the post on either side of this slot serve to guide the operating-lever and prevent it from lateral swaying. In this form of the invention it would be necessary to set the post N somewhat farther away from the connecting-piece G than in the other forms of my invention.

It will be observed that in each form of guide shown there is a single guide arranged near the inner ends of the operating-levers, which guide is so combined therewith as to prevent either of them from lateral swaying or sidewise movement.

Having thus described my invention, what I claim, and desire to secure by Letters Patent, is—

1. In a swinging gate, the combination with the operating-levers the inner ends of which move in a vertical plane outside the plane of the hinge of the gate, of an arm carried by the operating-levers and extending to a point substantially opposite the gate-hinge, and connections between the arm and the gate, substantially as described.

2. The combination of a swinging gate provided with a laterally-projecting frame, the operating-levers inclined so that their outer ends extend toward the roadway, the connecting-bar connected at its lower end with the said laterally-projecting frame, and an arm carried by the operating-levers extending to a point substantially opposite to the gate-hinges, to which arm the upper end of the connecting-bar is connected, substantially as set forth.

3. The combination with a swinging gate, the operating-levers, and a connecting-bar between the operating-levers and the gate, of a coupling or connection uniting directly the inner ends of the operating-levers, a swinging fulcrum or support for one of the operating-levers, and a swinging guide for preventing lateral movement of the inner ends of the levers, substantially as set forth.

4. The combination with a swinging gate, the operating-levers and a connecting-bar between the operating-levers and the gate, of a guide which prevents lateral swaying or movement of the inner ends of the operating-levers, and a post arranged close to the inner ends of the operating-levers, the said guide being carried directly by the said post, and vertically disposed substantially as set forth.

5. The combination with a swinging gate, the operating-levers, and the connecting-bar between the inner ends of the operating-levers and the gate, of the posts upon which the levers are pivotally supported, the connecting-piece between the posts, the post N arranged between the said lever-supporting posts, and a guide for the inner ends of the levers carried by the said post N, substantially as set forth.

6. The combination with a swinging gate, the operating-levers, and a connecting-bar between the operating-levers and the gate, of a guide L for the inner ends of the operating-levers, the said guide having the horizontal portion $l$ and the jointed connections $l'$ with its support, and an eye carried by one of the operating-levers, which encircles the said guide-rod, substantially as set forth.

7. The combination of a swinging gate provided with a laterally-projecting frame, the operating-levers, one of them mounted upon a fixed pivot and the other upon a swinging or movable pivot, a connection or coupling between the inner ends of the operating-levers, an arm carried by the operating-levers extending to a point substantially opposite to the hinge-line of the gate, a connecting-bar between the said arm and the laterally-projecting frame of the gate, and a guide for the inner ends of the operating-levers which prevents them from having lateral or swaying movement, while allowing free vertical movement, substantially as set forth.

In testimony whereof I have signed my name to this specification in the presence of two subscribing witnesses.

WILLIAM RICHARD WHITE.

Witnesses:
　IsaAc Sanders,
　Luella Evelyn White.